(12) United States Patent
Bormann et al.

(10) Patent No.: US 7,069,456 B2
(45) Date of Patent: Jun. 27, 2006

(54) METHOD AND APPARATUS FACILITATING DIRECT ACCESS TO A SERIAL ATA DEVICE BY AN AUTONOMOUS SUBSYSTEM

(75) Inventors: David S. Bormann, Sunnyvale, CA (US); Chao-Hsin Chi, San Jose, CA (US); Frank P. Hart, Apex, NC (US); Edwin J. Pole, II, Hillsboro, OR (US); Dong Tieu, Union City, CA (US)

(73) Assignee: Intel Corporation, Santa Clara, CA (US)

( * ) Notice: Subject to any disclaimer, the term of this patent is extended or adjusted under 35 U.S.C. 154(b) by 520 days.

(21) Appl. No.: 09/752,263

(22) Filed: Dec. 28, 2000

(65) Prior Publication Data
US 2002/0087898 A1    Jul. 4, 2002

(51) Int. Cl.
*G06F 1/28* (2006.01)

(52) U.S. Cl. .................. 713/340; 713/323; 710/14
(58) Field of Classification Search ............... 713/300, 713/320, 321, 323, 324, 340; 710/8, 14
See application file for complete search history.

(56) References Cited

U.S. PATENT DOCUMENTS

| | | | |
|---|---|---|---|
| 5,838,983 A | * | 11/1998 | Atkinson ............... 713/322 |
| 6,038,672 A | * | 3/2000 | Klein .................... 713/322 |
| 6,266,714 B1 | * | 7/2001 | Jacobs et al. ............ 710/14 |
| 6,496,507 B1 | * | 12/2002 | Nyudou ................ 370/220 |

* cited by examiner

*Primary Examiner*—Thuan Du
(74) *Attorney, Agent, or Firm*—Blakely, Sokoloff, Taylor & Zafman LLP (57) ABSTRACT

A method and apparatus for facilitating direct access to a serial Advanced Technology Attachment (ATA) device by an autonomous subsystem in the absence of the main operating system (OS).

14 Claims, 7 Drawing Sheets

| ACPI State | Parallel ATA accessible by: |
|---|---|
| S0 | Main system |
| S1 | Main system |
| S2 | Main system |
| S3 | Subsystem |
| S4 | Subsystem |
| S5 | Subsystem |

METHOD AND APPARATUS FACILITATING DIRECT ACCESS TO A SERIAL ATA DEVICE BY AN AUTONOMOUS SUBSYSTEM

FIELD OF THE INVENTION

The present invention pertains to the field of computers. More particularly, the present invention relates to a method and apparatus facilitating direct access to a serial Advanced Technology Attachment (ATA) device by an autonomous subsystem in the absence of the main operating system (OS).

BACKGROUND OF THE INVENTION

Computer based systems are becoming more mobile. This mobility often places an emphasis on usability. Usability is often extended by the ability to operate the equipment for longer periods of time. This time period is often related to the power consumption of the equipment, particularly in battery operated equipment. Thus, high power consumption may pose problems.

Numerous approaches to reducing power consumption have been tried. Powering off equipment when not in active use is one approach. Other approaches involve putting equipment in various lower power states, such as, idle mode, sleep mode, hibernation mode, etc. Such approaches may involve turning off portions of circuits or components, powering down subsystems and/or the main system, lowering supply voltages, altering clocking mechanisms, transferring data from, for example, random access memory (RAM) to disk storage, etc.

One such approach to conserve power consumption is to have the host or central processing unit (CPU) powered down while having a subsystem active. The subsystem may need to transfer information for which the host CPU upon exiting a powered down state boots up the operating system, performs the transfer, and then powers down. Time required to boot up the operating system may present a problem for a subsystem that needs a rapid response. Power consumed during the boot up process may also present a problem for battery operated equipment.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for an autonomous subsystem accessing a serial ATA device in the absence of the main OS is described.

For purposes of discussing the invention, it is to be understood that various terms are used by those knowledgeable in the art to describe techniques and standards. The power or energy consuming state of a device, such as a microprocessor, central processing unit (CPU), or even a system is to be understood as having a continuum of power ranges for operation, such as, fully awake, idle mode, sleep mode, hibernation mode, fully off, etc. These different power states may be invoked and/or maintained by mechanisms such as control lines, commands, frequency control, voltage control, current control, etc.

For example, one industry specification is the Advanced Configuration and Power Interface Specification (ACPI, Revision 2.0, published Jul. 27, 2000), describes a variety of states and configurations in which a device, such as a CPU and/or system may operate. For convenience in the discussion, reference will be made to several ACPI defined S states. These ACPI S states are S0, S1, S2, S3, S4, and S5. In one embodiment, S0 is considered the normal on or operating state in which a system is fully on and executing a main operating system. States S1, S2, S3, and S4 are considered as various lower power states. For example in, S1 the main system is on, however it is idling. S2 is a lower power state where the CPU may be off and memory is being refreshed. S3 is similar to S2 except peripheral devices can be powered down. S4 is lower power still with memory contents stored in a non-volatile device (such as a hard disk) and power to memory is turned off. Finally, state S5 is fully off, except for perhaps a real time clock (RTC).

Regardless of the standard used to describe the state of a system, there are resources connected to a system that may only be accessible to that system when the system is in certain states. While the system is in those states when the resources are not accessible by the system, it may be possible to connect those resources to other systems and/or subsystems that may be able to utilize them. Additionally, it is to be appreciated that in some of these states the main system operating system (OS) may not be executing, and yet the resources may be shared. That is, in certain states there may be no need for the OS. For example, the "main" system is not materially affected by the "subsystem" use and therefore suffer little to no performance degradation. Such a subsystem that may be able to make effective use of the resources is referred to herein as an autonomous subsystem.

A computer-based system may be composed of many components, which are described herein as a main system and possibly multiple subsystems. For example, in a personal computer there is a main processor which executes most of the applications and often to run or execute the applications runs a main operating system such as the Windows® operating system or the Linux® operating system. Subsystems in a personal computer, for example, may include, but are not limited to, the keyboard, the sound system, the graphics, etc.

An example of an autonomous subsystem may be a radio frequency (RF) communications link that remains active for receiving communications and when necessary connecting to a main system resource, such as a hard disk to store messages.

Communications between a main system and its resources and a subsystem and its resources may be effected by, for example, but is not limited to, a wired bus, wireless techniques (such as optical, RF, etc.), etc. The communication contents may include, but is not limited to, commands, data, software code, signals, messages, information, interrupts, etc.

A machine-readable medium is understood to include mechanisms for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Figure 1:
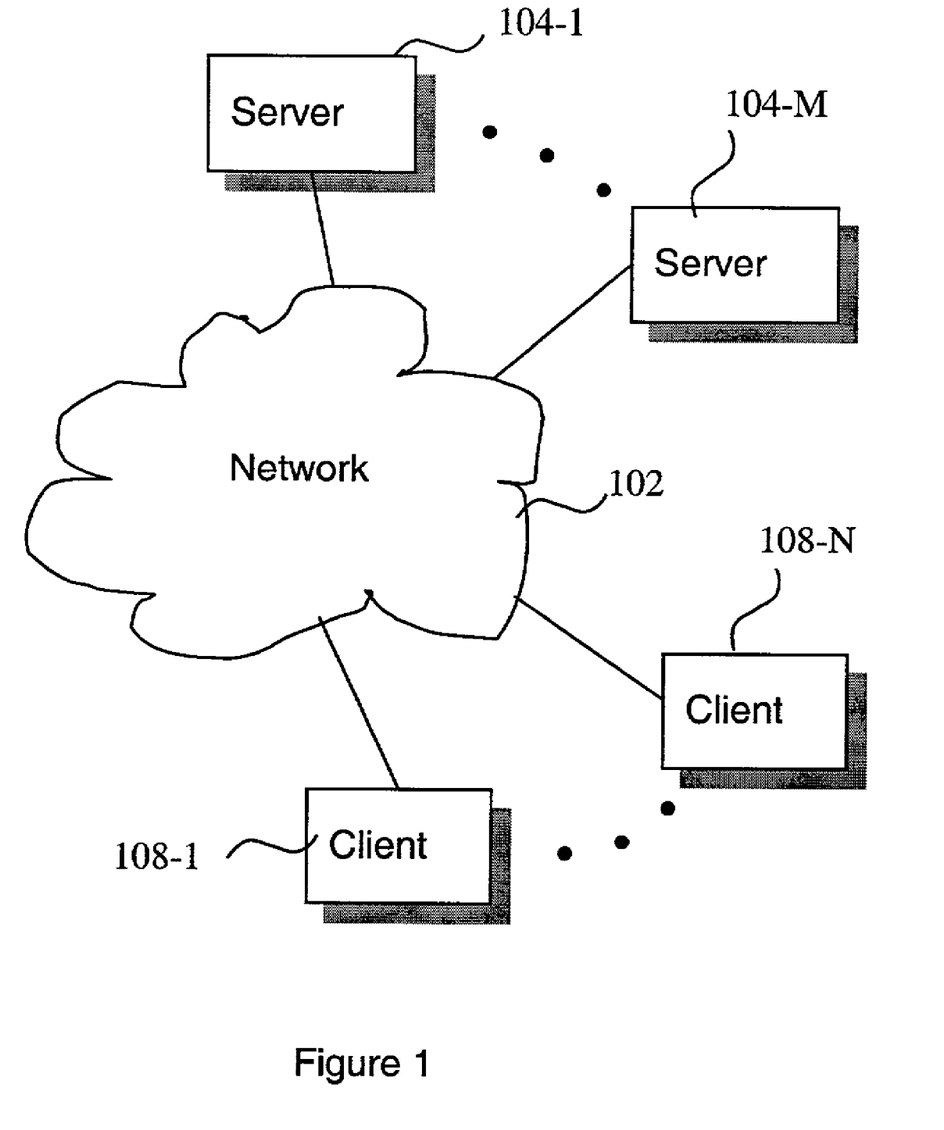
FIG. 1 illustrates a networked computer environment.

FIG. 1 illustrates a network environment in which the techniques described may be applied. As shown, several computer systems in the form of servers 104-1 through 104-M and clients 108-1 through 108-N are connected to each other via a network, which may be, for example, the Internet. Note that alternatively the network 102 might be or include one or more of: a Local Area Network (LAN), Wide Area Network (WAN), satellite link, fiber network, cable network, or a combination of these and/or others. The method and apparatus described herein may be applied to essentially any type of communicating technique or device whether local or remote, such as a LAN, a WAN, a system bus, a disk drive, storage, etc.

Figure 2:
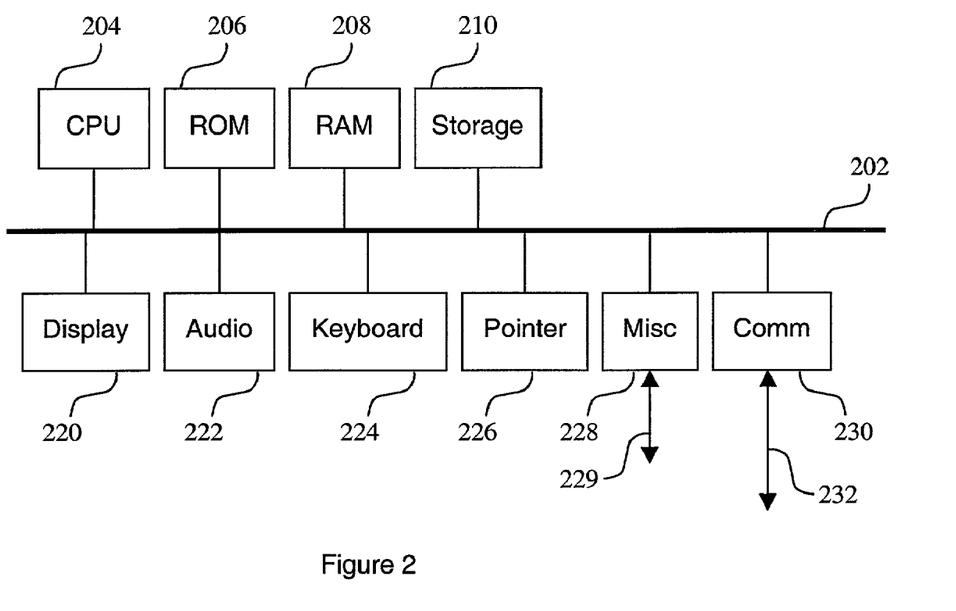
FIG. 2 is a block diagram of a computer system.

FIG. 2 illustrates a conventional personal computer in block diagram form, which may be representative of any of the clients and servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), etc. The CPU 204 may be a single, multiple, or even a distributed computing resource. The ROM 206 may be any type of non-volatile memory, which may be programmable such as, mask programmable, flash, etc. RAM 208 may be, for example, static, dynamic, synchronous, asynchronous, or any combination. Storage 210, may be Compact Disc (CD), Digital Versatile Disk (DVD), hard disks (HDD), optical disks, tape, flash, memory sticks, video recorders, etc. Display 220 might be, for example, a Cathode Ray Tube (CRT), Liquid Crystal Display (LCD), a projection system, Television (TV), etc. Audio 222 may be a monophonic, stereo, three dimensional sound card, etc. The keyboard 224 may be a keyboard, a musical keyboard, a keypad, a series of switches, etc. The pointer 226, may be, for example, a mouse, a touchpad, a trackball, joystick, etc. I/O devices 228, might be a voice command input device, a thumbprint input device, a smart card slot, a Personal Computer Card (PC Card) interface, virtual reality accessories, etc., which may optionally connect via an input/output port 229 to other devices or systems.

An example of a miscellaneous I/O device 228 would be a Musical Instrument Digital Interface (MIDI) card with the I/O port 229 connecting to the musical instrument(s). Communications device 230 might be, for example, an Ethernet adapter for local area network (LAN) connections, a satellite connection, a settop box adapter, a Digital Subscriber Line (XDSL) adapter, a wireless modem, a conventional telephone modem, a direct telephone connection, a Hybrid-Fiber Coax (HFC) connection, cable modem, etc.

The external connection port 232 may provide for any interconnection, as needed, between a remote device and the bus system 202 through the communications device 230. For example, the communications device 230 might be an Ethernet adapter, which is connected via the connection port 232 to, for example, an external DSL modem. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

Referring back to FIG. 1, clients 108-1 through 108-N are effectively connected to web sites, application service providers, search engines, and/or database resources represented by servers, such as servers 104-1 through 104-M, via the network 102. The web browser and/or other applications are generally running on the clients 108-1 through 108-N, while information generally resides on the servers 104-1 through 104-M. For ease of explanation, a single client 108-1 will be considered to illustrate one embodiment of the present techniques. It will be readily apparent that such techniques can be easily applied to multiple clients.

A subsystem may be, but is not limited to, one or more of the elements of FIG. 2. For example, Storage 210 may have a subsystem that handles how data is to be stored and retrieved. Audio 222 may have a subsystem that handles when to, for example, power down speakers. Communications device 230 may, for example, have a subsystem that needs to transfer information to the Storage 210 without using the main operating system upon receiving a message.

Figure 3:
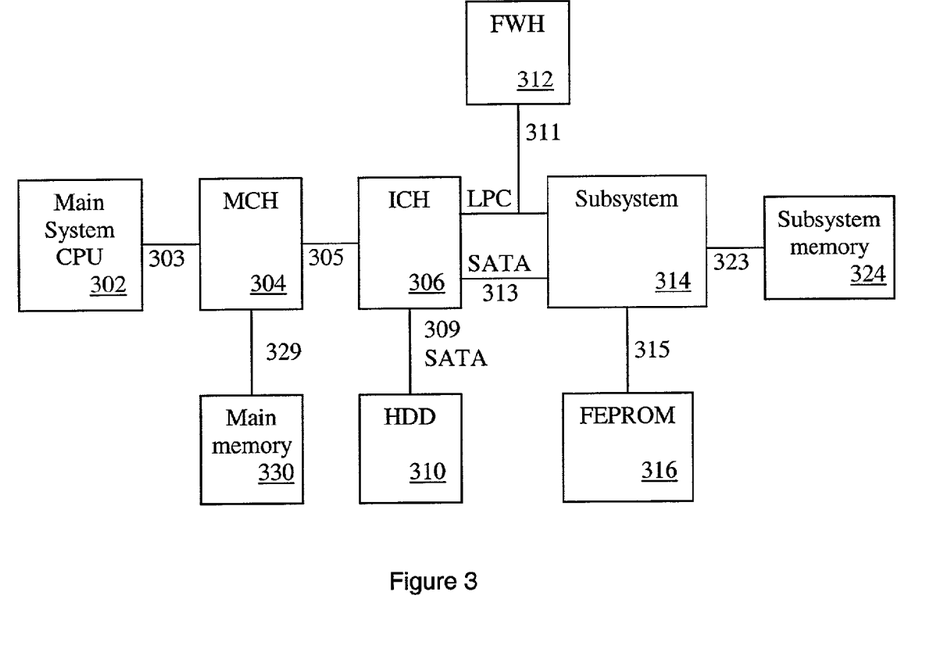
FIG. 3 illustrates a system architecture according to one embodiment.

FIG. 3 illustrates one possible system architecture for one embodiment. A host central processing unit (CPU) 302 is coupled via link 303 to a memory controller hub (MCH) 304. The MCH 304 is coupled via link 305 to an input/output controller hub (ICH) 306, and via link 329 to a main memory 330. The ICH 306 is coupled to a hard disk drive (HDD) 310 via a serial ATA (SATA) link 309. The ICH 306 is also coupled to the subsystem 314 via a serial ATA (SATA) link 313. Additionally the ICH 306 is coupled via a low pin count (LPC) 311 link to a firmware hub (FWH) 312, and the subsystem 314. The subsystem 314 is coupled to subsystem memory 324 via link 323. The subsystem 314 is coupled to a flash electrically programmable read only memory (FEPROM) 316 via link 315.

Figure 4:
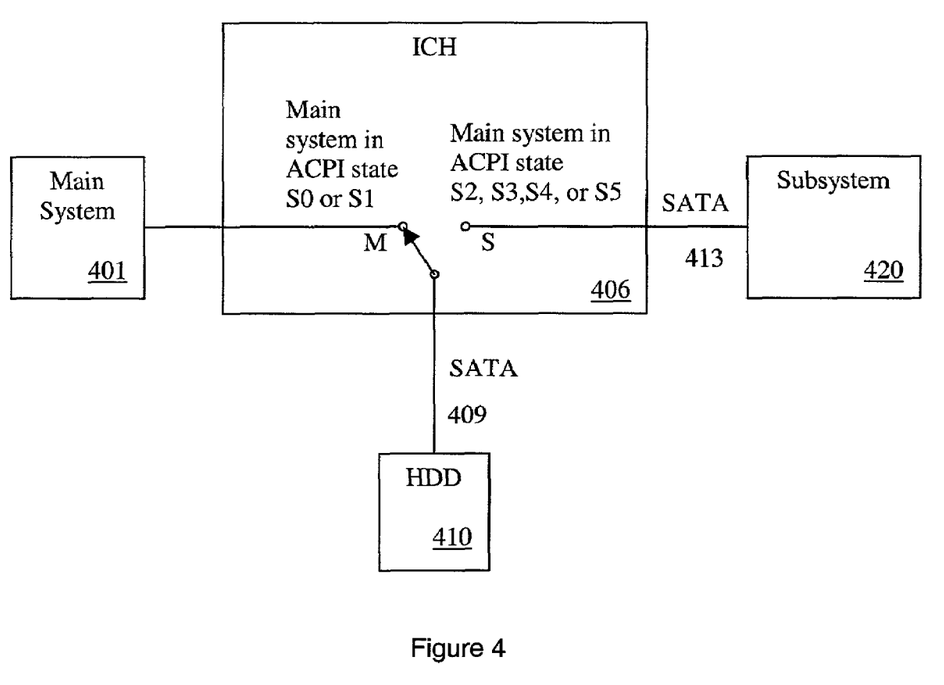
FIG. 4 illustrates in block diagram of switching access according to embodiment.

FIG. 4 illustrates in block diagram form the ICH 406 switch in a access to the HDD 410 SATA link 409 between the main system 401 and the subsystem 420. When the main system is in ACPI state, in this example, S0 or S1 then the switch is in the M position (as shown), and the main system 401 has access to the HDD 410 via SATA link 409. When the main system is in ACPI state S2, S3, S4, or S5 then the switch is in the S position, and the subsystem 420 has access to the HDD 410 via SATA link 409 through the SATA 413 link to the subsystem 420. An alternative embodiment may have switch position M corresponding to main system ACPI states S0, S1, and S2, in which case switch position S would be activated only for main system ACPI states S3, S4, or S5.

Figure 5:
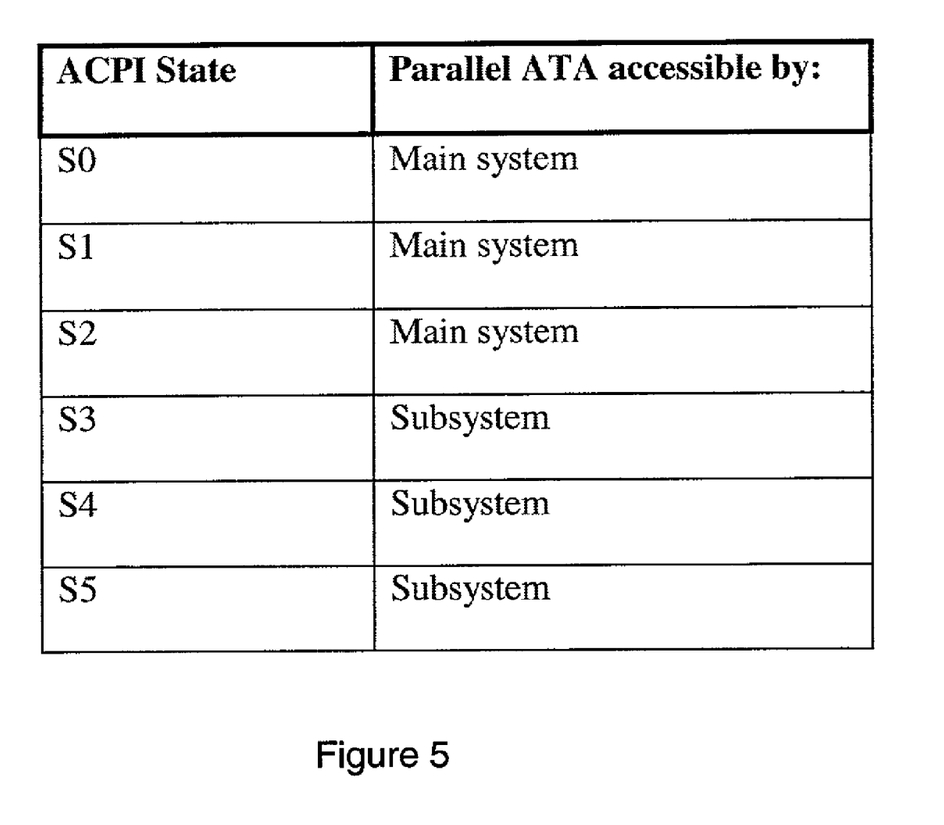
FIG. 5 illustrates an ACPI state table.

FIG. 5 illustrates in a table form the ACPI states and the respective serial ATA (SATA) accessibility by either the main system or the subsystem in one embodiment. In this embodiment, ACPI states S0, S1, and S2 allow accessibility of the SATA by the main system, and ACPI states S3, S4, and S5 allow accessibility of the SATA by the subsystem.

Figure 6:
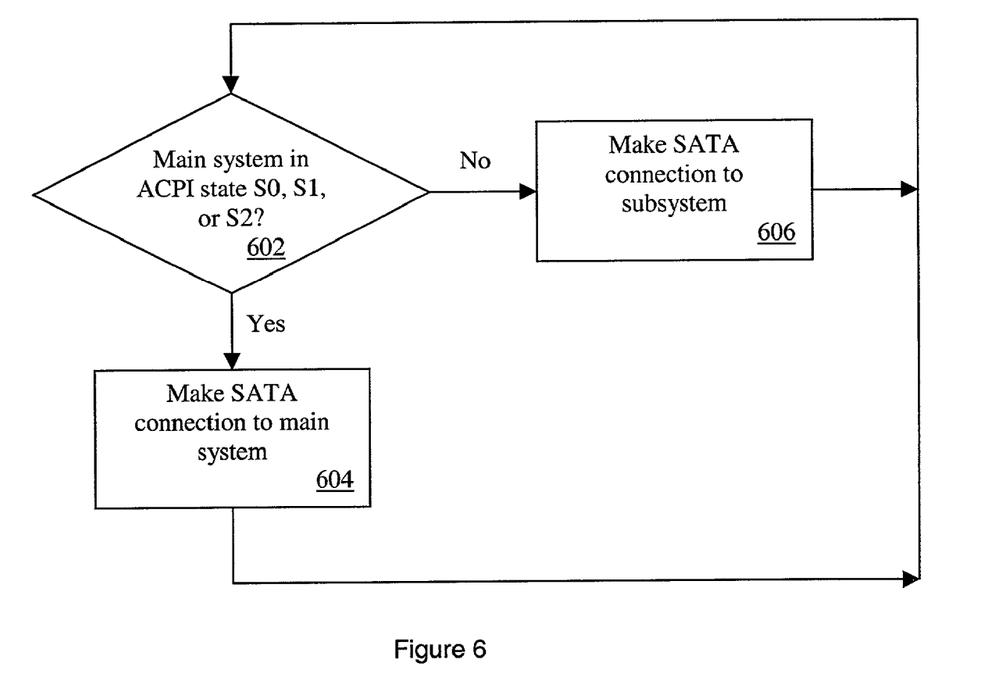
FIG. 6 illustrates a flow chart describing the steps according to one embodiment.

FIG. 6 illustrates in flow chart form one embodiment. At 602 a check is made of the main system ACPI state. If the main system ACPI state is S0, S1, or S2, then a connection of the SATA to the main system is made 604. If the main system ACPI state is not S0, S1, or S2, then a connection of the SATA to the subsystem is made 606. After the connection is made to either (604 or 606) then the main system ACPI state is again checked (at 602). In this manner, the connection of the SATA is kept current and may respond to any changes in the main system ACPI state. In this way, the main system is controlling the SATA connection and will have access when needed, thus little or no degradation in the SATA performance when the main operating environment is active will be suffered.

Figure 7:
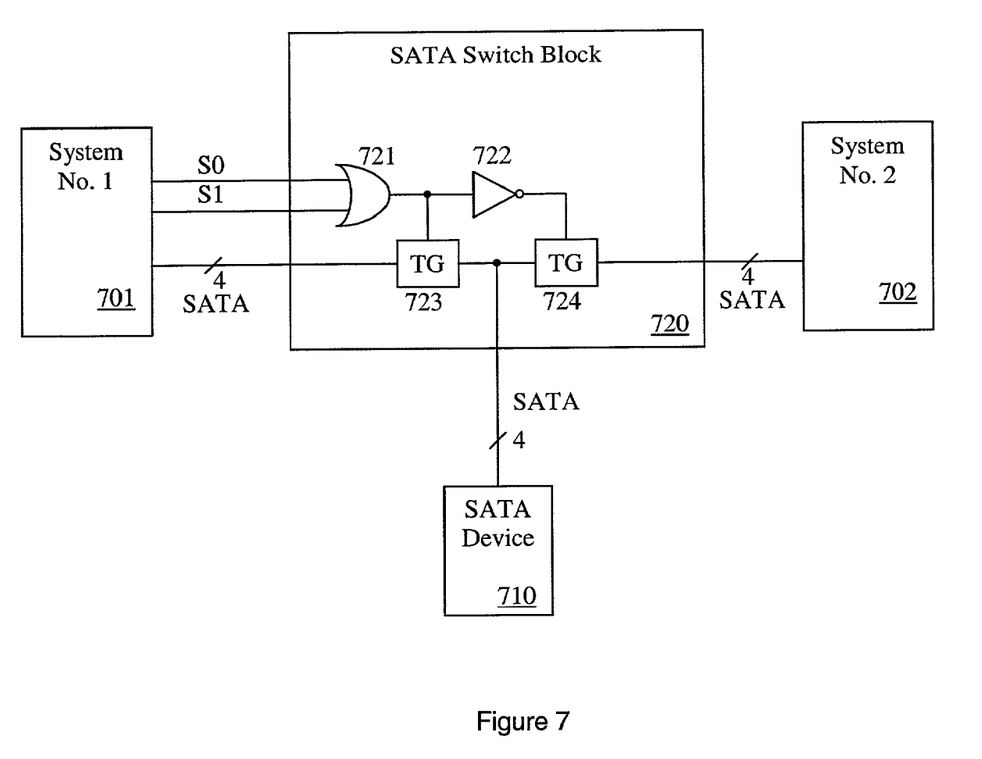
FIG. 7 illustrates a block diagram according to one embodiment.

FIG. 7 illustrates one embodiment in partial block and schematic form. System Number (No.) 1, 701 provides to the SATA Switch Block 720, two signals S0 and S1 indicating the ACPI S state of system no. 1 701. In one embodiment, the S0 and S1 signals are routed to an OR gate 721. Additionally, in this example embodiment, 4 SATA lines are illustrated connecting system no. 1 701 with the SATA switch block 720, where they connect to a transmission gate (TG) type device 723. The 4 SATA lines may be 2 pair of low voltage differential signaling (LVDS) lines. One pair for transmitting and one pair for receiving. 4 SATA lines are illustrated connecting system no. 2 702 with the SATA switch block 720, where they connect to a transmission gate (TG) type device 724. 4 SATA lines are illustrated connecting SATA device 710 with the SATA switch block 720, where they connect to both TG 723 and 724 type devices. The output of OR gate 721 connects to the control for TG type device 723 and inverter 722. The output of inverter 722 connects to the control for TG type device 724.

In operation, because of the inverter 722 between the TG control of 723 and 724, logically when TG 723 is on, TG 724 will be off, and vice versa. Thus, when either S0 or S1 is active logical high, the output of OR gate 721 will be active high which will turn on TG 723 and through inverter 722 will turn off TG 724. In this case then, the 4 SATA lines from system no. 1 will be electrically connected to the corresponding 4 SATA lines from the SATA device 710. At the same time, because TG 724 is off, system no. 2's 702 4 SATA lines will be electrically disconnected from the 4 SATA lines of SATA device 710. Thus system no. 1 701 will be able to access the SATA device 710.

When neither signal S0 or S1 is logically high, then the reverse will occur and system no. 2 702 will be connected to, and be able to, access SATA device 710, and system no. 1 701 will be disconnected from SATA device 710.

The embodiment as illustrated in FIG. 7 is to show the switching mechanism involved. It is to be understood that the actual IDE controller(s) that may communicate with the SATA device 710 may be embedded, for example, in system no. 1 701, and/or system no. 2 702.

The illustrated embodiments of the present invention are to be understood as applicable to a plurality of system and/or subsystems within a single and/or distributed system or systems. For example, in a single system, there may be a main system with a main CPU and standard operating system and a subsystem handling, for example, RF communications. Likewise, the implementation of the present invention is to be understood as not precluding applicability to systems that may comply with other industry standards or specifications, for example, other specifications relating to system power and/or control.

Thus, a method and apparatus facilitating direct access to a serial Advanced Technology Attachment (ATA) device by an autonomous subsystem in the absence of the main operating system (OS). Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method comprising:
identifying a power state of a first system, the power state to be one of at least a first and second power states, the second power state to consume less power than the first power state; and
in response to the system being in the second power state, switching, without using a main operating system, a serial Advanced Technology Attachment (SATA) link from the first system to a link with an autonomous subsystem.

2. The method of claim 1, wherein the power state comprises of an Advanced Configuration Power Interface Specification (ACPI) state.

3. The method according to claim 2, wherein if the ACPI state is S0, S1, or S2 then the SATA is switched to the first system, and if the ACPI state is S3, S4, or S5 then the SATA is switched to the subsystem.

4. The method according to claim 2, wherein if the ACPI state is S0, or S1 then the SATA is switched to the first system; and if the ACPI state is S2, S3, S4, or S5 then the SATA is switched to the subsystem.

5. A machine-readable medium having stored thereon data representing sets of instructions which, when executed by a machine, cause the machine to:
identify a power state of a first system, the power state to be at least one of a first and second power states, the second power state to consume less power than the first power state; and
in response to the system being in the second power state, switch, without use of a main operating system, a serial Advanced Technology Attachment (SATA) link from the first system to a link with an autonomous subsystem.

6. The machine-readable medium of claim 5, wherein the power state comprises an Advanced Configuration Power Interface Specification (ACPI) state.

7. The machine-readable medium of claim 6, wherein if the ACPI state is S0, S1, or S2 then the SATA is switched to the first system, and if the ACPI state is S3, S4, or S5 then the SATA is switched to the subsystem.

8. The machine-readable medium of claim 6, wherein if the ACPI state is S0, or S1 then the SATA is switched to the first system, and if the ACPI state is S2, S3, S4, or S5 then the SATA is switched to the subsystem.

9. A system comprising:
a memory;
a serial Advanced Technology Attachment (SATA) device connected to the memory and to a switch; and
the switch to
connect the system to the SATA device when the system is in a first power state, and
connect an autonomous subsystem to the SATA device, without using a main operating system, when the system is in a second power state, the second power state to consume less power than the first power state.

10. The system of claim 9, wherein the switch connecting the SATA device alternately connects the system and the subsystem to the SATA device.

11. The system of claim 9, wherein the switch operation is controlled by signals from the system.

12. An apparatus comprising:
a serial Advanced Technology Attachment (SATA) device connected to a switch; and
the switch to
connect a system to the SATA device when the system is in a first power state, and
connect an autonomous subsystem to the SATA device, without using a main operating system, when the system is in a second power state, the second power state to consume less power than the first power state.

13. The apparatus of claim 12, wherein the switch connecting the SATA device only connects to either the system or the subsystem.

14. The apparatus of claim 12, wherein the switch operation is controlled by signals from the system.

* * * * *